(12) United States Patent
Hartung et al.

(10) Patent No.: US 9,483,593 B2
(45) Date of Patent: Nov. 1, 2016

(54) METHOD FOR DECOMPOSING A HARDWARE MODEL AND FOR ACCELERATING FORMAL VERIFICATION OF THE HARDWARE MODEL

(71) Applicant: Intel Corporation, Santa Clara, CA (US)

(72) Inventors: Robert Hartung, Braunschweig (DE); Matthias Glueck, Wendeburg (DE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/463,857

(22) Filed: Aug. 20, 2014

(65) Prior Publication Data

US 2016/0055287 A1 Feb. 25, 2016

(51) Int. Cl.
*G06F 17/50* (2006.01)

(52) U.S. Cl.
CPC ......... *G06F 17/504* (2013.01); *G06F 17/5022* (2013.01); *G06F 17/5081* (2013.01); *G06F 17/5045* (2013.01); *G06F 2217/66* (2013.01)

(58) Field of Classification Search
CPC .................... G06F 17/5045; G06F 17/5081
USPC ......... 716/100, 106, 104, 107, 108, 110, 111
See application file for complete search history.

(56) References Cited

U.S. PATENT DOCUMENTS

| | | | | |
|---|---|---|---|---|
| 6,056,784 A * | 5/2000 | Stanion | .................. | G06F 17/504 703/15 |
| 6,421,818 B1 * | 7/2002 | Dupenloup | ......... | G06F 17/5045 716/105 |
| 6,453,449 B1 * | 9/2002 | Wada | ..................... | G06F 17/504 716/107 |
| 6,957,403 B2 * | 10/2005 | Wang | ............... | G01R 31/31704 703/16 |
| 8,429,580 B2 * | 4/2013 | Yeung | ................... | G06F 17/504 716/103 |
| 8,516,411 B2 * | 8/2013 | Gupta | ................. | G06F 17/5027 716/101 |
| 8,584,062 B2 * | 11/2013 | Xia | ........................... | G06F 8/43 716/101 |
| 8,930,863 B2 * | 1/2015 | Nayak | ................. | G06F 17/5081 716/104 |
| 2006/0117285 A1 * | 6/2006 | Kosugi | ..................... | G06F 1/24 713/400 |
| 2006/0271515 A1 * | 11/2006 | Alley | .................. | G06F 17/5022 |
| 2008/0216032 A1 * | 9/2008 | McElvain | ............. | G06F 17/504 716/106 |
| 2009/0106009 A1 * | 4/2009 | Alley | ................... | G06F 17/5022 703/14 |
| 2014/0282338 A1 * | 9/2014 | Nayak | ................. | G06F 17/5081 716/120 |

* cited by examiner

*Primary Examiner* — Stacy Whitmore

(74) *Attorney, Agent, or Firm* — Green, Howard & Mughal, LLP

(57) ABSTRACT

Described is a method performed by a computing device, the method comprises: deriving a hierarchal structure of hardware instances of a hardware block, wherein the hardware block is described in a register transfer language (RTL); determining complexity of at least one hardware instance, in the hierarchal structure, with reference to a complexity metric; identifying, in response to the determined complexity of the at least one hardware instance, whether the at least one hardware instance is to be modeled; and modifying the hierarchal structure with information about the to be modeled hardware instance.

19 Claims, 7 Drawing Sheets

METHOD FOR DECOMPOSING A HARDWARE MODEL AND FOR ACCELERATING FORMAL VERIFICATION OF THE HARDWARE MODEL

BACKGROUND

In pre-silicon verification, hardware design is verified against its specification. However, when the hardware design is a chip level design or a system level design including several chips coupled together, known formal verification tools and methods are inadequate to execute formal proofs on such complex problems.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

Figure 1:
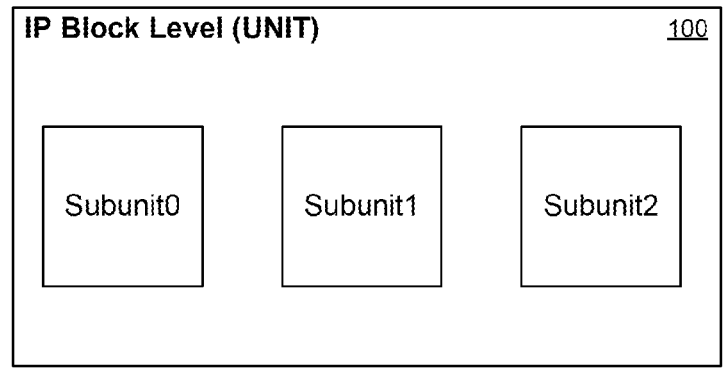
FIG. 1 illustrates an Intellectual Property (IP) block (UNIT) with subunits.

Some embodiments describe a method for Register Transfer Language (RTL) design decomposition to split an RTL hardware model (e.g., of a chip, processor, IP block, etc.) into units and subunits, and then dynamically generates functional (or behavioral) models for those units and subunits that instantiate those models in a next upper level of design hierarchy to generate a modified RTL model. In some embodiments, formal proof complexity of the RTL hardware model is reduced by the decomposition and subsequent modeling of subunits. In some embodiments, runtime speeds for formal verification is improved over known tools (e.g., JasperGold® from Jasper Design Automation). For example, some embodiments result in 7 to 30 times runtime speed improvement over native JasperGold® proofs. In some embodiments, runtime improvement is achieved by extensive parallel computation approach compared to executing computations sequentially on an entire design by known tools (e.g., JasperGold®). In some embodiments, memory consumption for formal verification is reduced over known tools. For example, some embodiments result in reducing memory consumption for formal verification by 4 times over JasperGold®.

In some embodiments, various types of modes of computation are executed after decomposition of the RTL hardware model. Examples of those modes include, X-propagation (Xprop) analysis, Dead-Code analysis, Finite State Machine (FSM) analysis, etc. In some embodiments, the Xprop dynamic model generation for subunits accelerates the Xprop proofs by evaluating the design paths for 'X' propagation. Here, 'X' refers to an unknown (i.e., a logic value of 0 or 1). In some embodiments, the model (also referred to here as the functional model, an abstract model) reflects the input to output port relationship of a subunit in view of 'X' propagation (i.e., X-transparency case). In some embodiments, the original RTL model for the subunit is no longer used when a functional model is generated which reflects the input to output port relationship of the subunit in view of 'X' propagation. In some embodiments, the functional model also considers that an 'X' can be generated within the model instead of being propagated from an input port (i.e., X-source case). In some embodiments, the modeling for the X-transparency and the X-source cases reduces logic complexity for Xprop formal proof.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct electrical connection between the things that are connected, without any intermediary devices. The term "coupled" means either a direct electrical connection between the things that are connected or an indirect connection through one or more passive or active intermediary devices. The term "circuit" means one or more passive and/or active components that are arranged to cooperate with one another to provide a desired function. The term "signal" means at least one current signal, voltage signal or data/clock signal. The meaning of "a," "an," and "the" include plural references. The meaning of "in"

includes "in" and "on." The terms "substantially," "close," "approximately," "near," and "about," generally refer to being within +/−20% of a target value.

Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

FIG. 1 illustrates an IP block 100 with subunits. IP block 100 may be described in RTL (e.g., VHDL, System Verilog, etc.). IP block 100 may describe any hardware block. For example, IP block 100 may be a chip level design or a system level design including several chips coupled together, a design block from a third party vendor which is then integrated to another design, a SoC, a multi-core processor, etc. The following embodiments are described with reference to System Verilog, but could be described in any RTL. In this example, IP block 100 is also referred as a UNIT (which is called an entity in VHDL and module in System Verilog) comprising hardware Subunits (e.g., Subunit0, Subunit1, Subunit2, etc.). UNIT 100 can have instances of other units (i.e., subunits) that together form a hierarchy (or a tree with branches and leafs).

Figure 2:
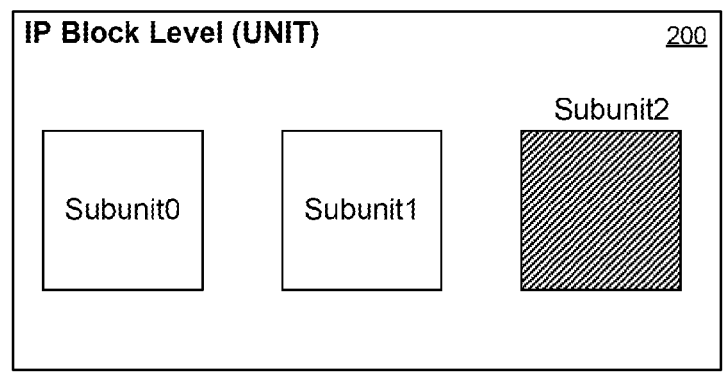
FIG. 2 illustrates the IP block with one or more subunits identified for being modeled, according to some embodiments of the disclosure.

FIG. 2 illustrates IP block 100 (now labeled as 200) with one or more subunits identified for being modeled, according to some embodiments of the disclosure. It is pointed out that those elements of FIG. 2 having the same reference numbers (or names) as the elements of any other figure can operate or function in any manner similar to that described, but are not limited to such.

In some embodiments, a method is provided which breaks down the complexity of UNIT 200 by black boxing subunits (shown as pattern). In some embodiments, the black boxed subunits are replaced with a functional model of their behavior. In some embodiments, replacing the black boxed subunits might not happen every time. For example, the black boxed subunits may not be replaced in Dead Code Analysis. In some embodiments, the method of black boxing is performed for each level in the hierarchy.

In some embodiments, whenever the complexity is too high (i.e., greater or equal to minimum complexity threshold) the subunit gets black boxed. In this example, Subunit2 of FIG. 2 has complexity greater or equal to minimum complexity threshold. Subunit0 and Subunit1 are not too complex here, and get black boxed as well. In some embodiments, whenever a complexity is greater or equal to maximum complexity threshold, the subunit gets analyzed further.

In some embodiments, the method (performed by one or more software modules) analyzes a tree of instances at the UNIT level (i.e., at level 100). For the purposes of this disclosure a module is a software, hardware, or firmware (or combinations thereof) system, process or functionality, or component thereof, that performs or facilitates the processes, features, and/or functions, functionalities and/or operations described here (with or without human interaction or augmentation) as being performed by the identified module. A module can include sub-modules. Software components of a module may be stored on a tangible machine readable medium. Modules may be integral to one or more servers, or be loaded and executed by one or more servers. One or more modules may be grouped into an engine or an application.

In some embodiments, the method (performed by one or more modules) checks each instance's complexity against a complexity metric to determine whether that instance should be black boxed (which is then optionally replaced with a functional model). In some embodiments, for Xprop analysis, instance's complexity is checked against a complexity metric to determine whether that instance should be black boxed. In some embodiments, for FSM analysis or Dead Code analysis, replacement of black boxed instances with a functional or behavioral model is not always done. In some embodiments, the complexity metric is one or more of: a sum of flip-flop bits in the hardware instance; a sum of latch bits in the hardware instance; or a sum of port bits of the hardware instance. In some embodiments, the complexity metric is a weighted average of one or more of: a sum of flip-flop bits in the hardware instance; a sum of latch bits in the hardware instance; and a sum of port bits of the hardware instance. In other embodiments, the complexity metric may take other forms.

In some embodiments, if a subunit's complexity metric (or complexity) is greater or equal to a minimum threshold (i.e., the lower threshold of the complexity metric), then that subunit is identified to be black boxed. In some embodiments, if a subunit's complexity metric is greater or equal to a maximum threshold (i.e., the upper threshold of the complexity metric), that subunit is further divided (if possible) into subunits and each of those subunits are analyzed for complexity.

Figure 3:
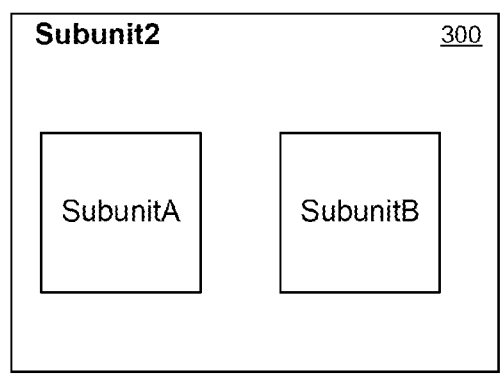
FIG. 3 illustrates a subunit with one or more further subunits that are checked for complexity, according to some embodiments of the disclosure.

FIG. 3 illustrates Subunit2 of IP block 200 which is divided down to two subunits (i.e., SubunitA and SubunitB) that are then individually checked for complexity, according to some embodiments of the disclosure. FIG. 3 is described with reference to FIGS. 1-2. Whenever a complexity is greater or equal to maximum complexity threshold, the subunit is analyzed further. In this example, SubunitA and SubunitB of Subunit2 are checked as well. If the complexity metric is less than the minimum threshold, then the subunit instance is not black boxed and is not modeled with a functional model (i.e., the RTL description of that subunit remains unchanged).

In some embodiments, by analyzing the tree of instances at the UNIT level and determining which subunits are to be black boxed, a new instance of the tree is derived having only the units that will be black boxed later. In such embodiments, with a bottom-up approach, subunits are analyzed and functional modules (i.e., the functional models) are generated. In some embodiments, all subunits are black boxed whose complexity is above the complexity metric, and those black boxed subunits are replaced with their functional models depending on the type of modes (e.g., Xprop analysis, dead code analysis, FSM analysis, etc.).

Figure 4:
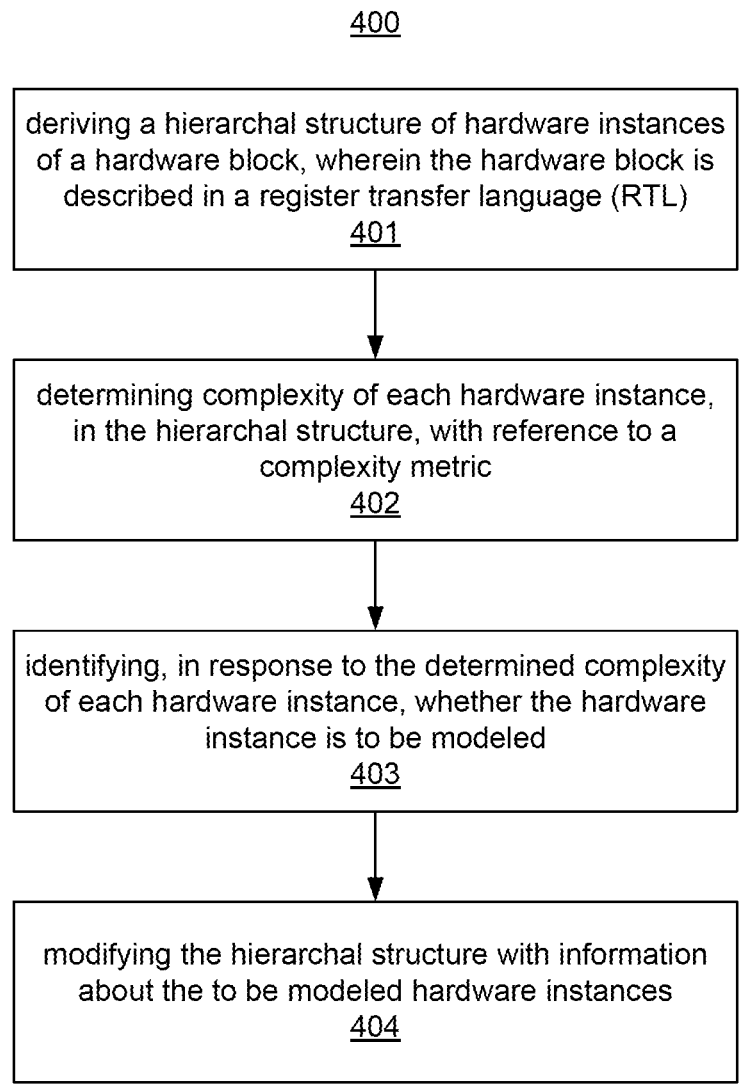
FIG. 4 illustrates a flowchart of a method for decomposing the IP block to form a new hierarchical structure for accelerating formal verification of the IP block, according to some embodiments of the disclosure.

FIG. 4 illustrates a flowchart 400 of a method for decomposing the IP block to form a new hierarchical structure for accelerating formal verification of the IP block, according to some embodiments of the disclosure. It is pointed out that those elements of FIG. 4 having the same reference numbers (or names) as the elements of any other figure can operate or function in any manner similar to that described, but are not limited to such.

Although the blocks in the flowchart with reference to FIG. 4 are shown in a particular order, the order of the actions can be modified. Thus, the illustrated embodiments can be performed in a different order, and some actions/blocks may be performed in parallel. Some of the blocks and/or operations listed in FIG. 4 are optional in accordance with certain embodiments. The numbering of the blocks presented is for the sake of clarity and is not intended to prescribe an order of operations in which the various blocks must occur. Additionally, operations from the various flows may be utilized in a variety of combinations.

Program software code/instructions associated with flowchart 400 and executed to implement embodiments of the disclosed subject matter may be implemented as part of an operating system or a specific application, component, program, object, module, routine, or other sequence of instructions or organization of sequences of instructions referred to as "program software code/instructions," "operating system program software code/instructions," "application program software code/instructions," or simply "software."

At block 401, a hierarchal structure (e.g., a tree) of hardware instances (e.g., subunits) of a hardware block (e.g., Unit 100) is derived. Here, the hardware block is described in RTL. At block 402, complexity of each hardware instance, in the hierarchal structure, is determined with reference to a complexity metric (e.g., weighted average of number of flops, latches, and ports, sum of bits of flops, latches, and ports, etc.). At block 403, in response to the determined complexity of each hardware instance, whether the hardware instance is to be modeled is identified (i.e., black boxed and then replaced with a functional model). At block 404, a new hierarchal structure is formed (or the hierarchal structure is modified) with information of the to-be modeled hardware instances. In some embodiments, creating the new hierarchical structure (or modifying the hierarchical structure) comprises replacing hardware instances with functional or behavioral models.

In some embodiments, a complex subunit is divided down to its subunits until the subunit cannot be further divided down based on design structure or reaching the limit for minimal complexity. In some embodiment, for each leaf (i.e., the subunit which is identified to be black boxed), a functional model is dynamically (i.e., automatically) generated which is then instantiated in the next upper hierarchy level. The contents of the functional model may depend on the type of computation mode. In some embodiments, a complex subunit is only divided down to its subunits and the subunits are not further divided down.

Figure 5:
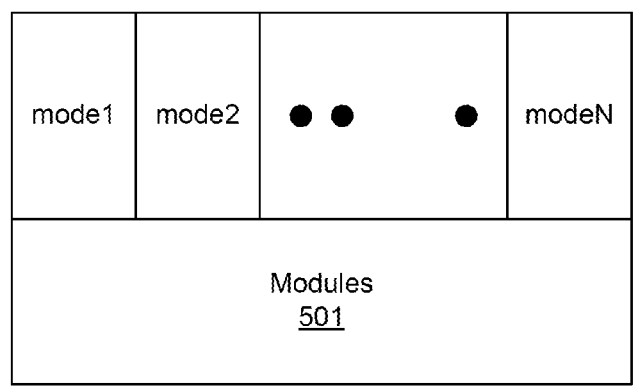
FIG. 5 illustrates a stack of modules for decomposing the IP block to form a new hierarchical structure and for performing formal verification of the IP block in one or more modes, according to some embodiments of the disclosure.

FIG. 5 illustrates a stack 500 of modules for decomposing the IP block to form a new hierarchical structure and for performing formal verification of the IP block in one or more modes, according to some embodiments of the disclosure. It is pointed out that those elements of FIG. 5 having the same reference numbers (or names) as the elements of any other figure can operate or function in any manner similar to that described, but are not limited to such.

In some embodiments, stack 500 comprises modules 501 that perform the method described. In some embodiments, modules 501 are executed on top of a base layer of a known tool (e.g., JasperGold®). In some embodiments, the formal verification of the IP Block depends on the type of computation mode. Here, 'N' modes are shown (i.e., modes1-N), where 'N' is an integer. Examples of modes include; Xprop analysis, Dead Code analysis, FSM analysis, etc.

In Xprop analysis, the computation using functional models determine, for example, whether there are Xs in the RTL design of UNIT 100. In Dead Code analysis, the computation using functional models determine, for example, whether there are unused block of codes that result into unused hardware in the chip or UNIT 100. Identifying such dead code can help reduce power and area of UNIT 100. In FSM analysis, the computation using functional models determine, for example, whether states in FSM are properly transitioning from one state to another, whether states are not reachable, whether state transitions are not happening, etc.

Figure 6:
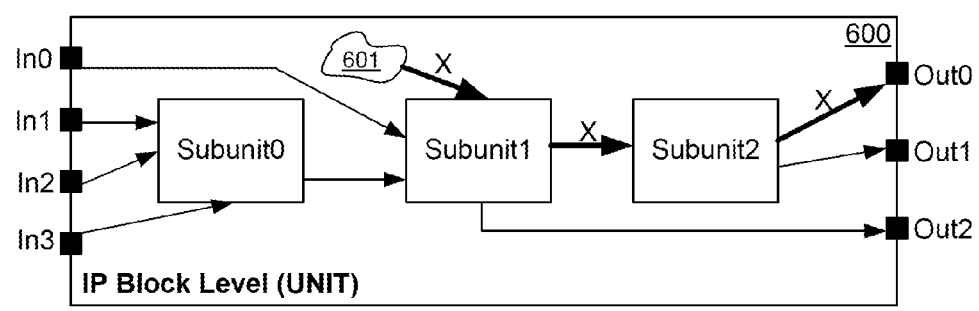
FIG. 6 illustrates an IP block being analyzed for X-propagation mode of formal verification, according to some embodiments of the disclosure.

FIG. 6 illustrates an IP block 600 being analyzed for Xprop mode of formal verification, according to some embodiments of the disclosure. It is pointed out that those elements of FIG. 6 having the same reference numbers (or names) as the elements of any other figure can operate or function in any manner similar to that described, but are not limited to such.

In Xprop verification, the IP Block is checked for any Xs in the design block or unit being tested. 'X' in a design block or unit may appear in different forms. For example, a design engineer may choose to use 'X' to indicate invalid states. FSMs can be coded in RTL using switch/case constructs where the default case may set the signals explicitly to 'X' to make sure an invalid state is provided in some cases. 'X' can also be coded in non-resettable flops and random access memories (RAMs). For silicon space reduction it may be desirable not to use a resettable flip-flop, and so the initial state of a node may be an 'X' (i.e., undefined). Also an 'X' is often used to give freedom to a simulation to reduce logic complexity. (Note that 'X' is generally used as "Don't care" in simulations and thus has a different meaning in simulation than in Formal Verification and might result in different and misleading results).

IP Block Level (UNIT) 600 shows three subunits—Subunit0, Subunit1, and Subunit2—four input ports (In0 to In3), and three output ports (Out0 to Out2). UNIT 600 shows different paths of 'X' propagation within UNIT 600. In some embodiments, 'X' comes form within UNIT 600 and then propagates to an output port. For example, 'X' comes from a non-resettable flop, RAM, hardcoded RTL, etc., (which is generally shown as coming from 601) and propagates to Subunit1. Then from Subunit1, 'X' propagates to Subunit2 and finally reaches output port Out0. In some embodiments, 'X' may also propagate from an input port to an output port. For example, 'X' comes from input port In0 and then propagates to Subunit1 and then propagates to output port Out2 of UNIT 600. In Xprop mode of formal verification or computation, a functional model of UNIT 600 is formed to capture its 'X' propagation behavior.

In some embodiments, two different calculations are made to capture the two different behaviors of 'X'—when the unit itself is the source of 'X', and when the unit is transparent for 'X'. The unit itself is the source of 'X' when 'X' is generated within the unit (e.g., by logic or memory 601), and propagates to any of the unit's outputs. In this example, UNIT 600 itself is a source of 'X' because 'X' comes from logic 601 within UNIT 600 and propagates to the output port Out0 via Subunit1 and Subunit2. The unit is transparent for 'X' when an 'X' can propagate from one of the unit's input port to its output port. In this example, Subunit1 and Subunit2 are transparent for 'X' because 'X' from the input port In0 propagates to the output ports Out1 and Out2 through Subunit1 and Subunit2 or from Subunit1. Here, Subunit0 may be transparent for 'X'.

In some embodiments, the first calculation by the method (performed by one or more software or hardware modules) is the source of 'X' calculation in which the module verifies whether an output port is receiving 'X' from within the unit. In some embodiments, the second calculation by the method is the 'X' transparency calculation. In such embodiments, a map or table indicating relationships between output ports and input ports of the unit with reference to 'X' propagation is formed. For example, for each output port, it is determined whether there is a path for 'X' propagation from any of the input ports.

In some embodiments, when the 'X' transparency calculation is complete, a functional Xprop model is generated describing the propagation of 'X' for that unit. In some embodiments, in the functional model, clock and reset signals and their associated functions are preserved. One example of the functional Xprop model expressed in System Verilog is:

```
module subunit_functional_model(
  In0, In1, In2, In3, // Input ports
  Out0, Out1, Out2, // Output ports
  model_clk   // clock
            // the flops here may not need a reset because the value can
  be anything due to the free* signals.
);
  input logic In0;
  // . . .
  always_ff @(posedge model_clk) begin
    {<<{Out0}} <= ((^In0) ^ (^In1) ^ (^In2) ^ (^In3)) &
free_and_Out1) | free_or_Out1;
  end
  // . . .
endmodule
```

In some embodiments, the modules (i.e., software or hardware modules) for performing the method are based on a known tool (e.g., JasperGold®) and may have specific implementations. Those specific implementations are described here for completeness sake. However, the embodiments can be performed using other implementations too. In some embodiments, a constraint file holds results for 'X' propagation from the first calculation (i.e., whether the output ports receive 'X' from within the unit). In some embodiments, the subunit_functional_model is generated after the second calculation (i.e., after 'X' transparency calculation). In some embodiments, for some modes there may be no modeling performed.

In some embodiments, the unit is elaborated with the functional model subunit_functional_model (i.e., the sub-unit model is used in its related unit). In such embodiments, memory and time is saved. In some embodiments, after the unit is elaborated, the functional models are instantiated. For example, a wrapper software tool or module is used to dynamically instantiate the functional subunit models for the unit. After the instantiating of the functional models, the functional models are connected to the original subunit's ports (i.e., input and output ports). After connecting the ports, the design is elaborated and the constraint file is loaded to constrain the free signals (i.e., free_and_Out0 and free_or_Out1). In some embodiments, by convention, free_and_Out1 signal does not become an 'X' and may be constrained as follows using TCL (Tickle).
  assume   {!$isunknown
(<hierarchie>.subunit_functional_model.free_and_Out1)};
If there is an 'X' for an input port, the above code may be expressed as:

```
  assume {$isunknown(<hierarchie>.subunit_functional_model.free_or_
Out1)};
otherwise
  assume {!$isunknown(<hierarchie>.subunit_functional_model.free_or_
Out1)};
```

In some embodiments, when JasperGold® is used as the underlying tool (e.g., when Modules 501 run on top of the underlying tool), to not introduce additional 'X', Jasper-Gold® is instructed that these "free" signals should not behave as the tool desires. In such embodiments, the free signals are constrained. Because there is a signal for each output, and there are two signals per output, one signal is needed for Source-Of-X check to describe the internal Source-Of-X behavior. Thus one signal is constrained to be X. In the above TCL statements, assume { . . . } statement is a tool internal syntax, and $isunknown(<signal>) statement is a general System Verilog syntax.

Generally, formal tools such as JasperGold® try to verify the desired behavior with mathematical proofs. This means the user has to specify the behavior to be proven. In the example of X-Prop, the user specifies the outputs that become X. In JasperGold® user may use the command (for each output): "assert –xprop <output>".

The above command generates a property that checks whether that output becomes X. The tool then analyzes the design and tries to find enabled X sources (e.g., an X assignment, an unregistered flop, etc.)—because the attribute can be configured. The tool can then calculate all paths from the output to the source of X (or vice versa) and see whether the X can propagate to the output.

A complex example is described below with X assignment in module A.

```
module A(  input logic [3:0] sel,
           output logic out);
  always @ (sel)
  case (sel)
    4'0: out <= 1'b1;
    4'1: out <= 1'b0;
    default : out <= 'X;
  endcase
endmodule
```

In this example, whenever (sel !=0000 && sel !=1111), there is an 'X' on the output out. The select signal (i.e., sel) may be a problem. For example, if the signal comes from another module B, and this module was replaced earlier by an X-Prop functional behavioral model, the functional/behavioral module B may be expressed as follows without the free signals:

```
module tornado_abstract_xprop_B(inp, tornado_clk, sel);
  input logic tornado_clk;
  input logic inp;
  output logic [3:0] sel;
  always @(posedge tornado_clk) begin
    {<<{sel}} <= {4{ (^inp)}};
  end;
endmodule
```

Here, the (^inp) statement allows 'X' to propagate from inp to sel, and so (^inp) will be '1', '0' or 'X' and sel can only have the values: "1111", "0000" and "XXXX". In one example, assuming that inp never becomes 'X' in the actual design and thus sel would only be "1111" or "0000", when B.sel is connected to A.sel, then the 'X' in module A will never be assigned while it would have been assigned earlier in the original RTL code. Here, the X'oring (^) of the input signals ({4{(^inp)}}) reduces freedom or versatility of the tool. Now when JasperGold® (or any other formal tool) tries to find Xs that propagate to the output port "out", Jasper-Gold® tries to find "matching signal values" so that "out" is equal to 'X'. This happens when sel is not "0000" or "1111".

But because the freedom or versatility of the tool is removed, the tool indicates that there is no 'X' on the output "out" of module A, which is why free signals are used in some embodiments:

```
module tornado_abstract_xprop_B(inp, tornado_clk, sel);
    input logic tornado_clk;
    input logic inp;
    output logic [3:0] sel;
    wire [3:0] free_and_sel;
    wire [3:0] free_or_sel;
    always @(posedge tornado_clk)
    begin
        {<<{sel}} <= ({4{(^inp)}} & free_and_sel) | free_or_sel;
    end;
enmodule.
```

Here, the two operations (and '&' and or '|') are used to bring back the freedom to the tool—because the '&' can make the signal "000 . . . 000" and OR'ing any value onto it will provide any desired value the tool needs.

Two more signals are used to bring back freedom to the tool, according to some embodiments. The tool can use any desired value on these free signals and, if configured, un-driven signals can be a source of 'X' as well. In some embodiments, since new "Xs" are not introduced in the design, the signals are not 'X' by default and only if module B is the source of X for output "sel", the signal can become an 'X'.

In some embodiments, the two free signals (i.e., free_and_Out0 and free_or_Out1) are implementation specific signals. The tool (e.g., JasperGold®) generates a trace and looks at the output ports to find value of respective signals on the output ports. Examples of these values are a concrete value (0 or 1), an 'X' at a bit position, or the whole signal may be an 'X'. Because the tool looks for matching signal values, the wrapper reduces freedom of the output due to the statement in the subunit_functional_model:

{<<{Out0}}<=(((^In0)^(^In1)^(^In2)^(^In3));

If one signal of the input ports is an 'X' then the output port Out0 will be an 'X' as well. For signals that are larger than 1 bit, a modification is made. Consider, for example, output port Out1 to be 128 bit wide, then the code line can be expressed as:

{<<{Out1}}<={128{(((^In0)^(^In1)^(^In2)^(In3))}};

With output port Out1 being 128 bits wide, the statement on the right results in a value of all 1s (111 . . . 1111) or all 0s (000 . . . 000) or all Xs (XXX . . . XXX) to give the tool (e.g., JasperGold®) the possibility to allow all values for the output ports. When having a value of (11111) or (00000), two signals provide all possible values:

((11111) & (free_and)) | (free_or)
((00000) & (free_and)) | (free_or)

Using two signals, one that is ANDed and another one that is OR'ed with the value, gives the tool the freedom to allow any output value. Using one of the free signals, the behavior of an 'X' within the design can be modeled. Afterwards, the original units are replaced with an equivalent functional model describing its behavior for Xprop mode verification. In some embodiments, a similar approach can be tailored for other modes of verification.

Figure 7:
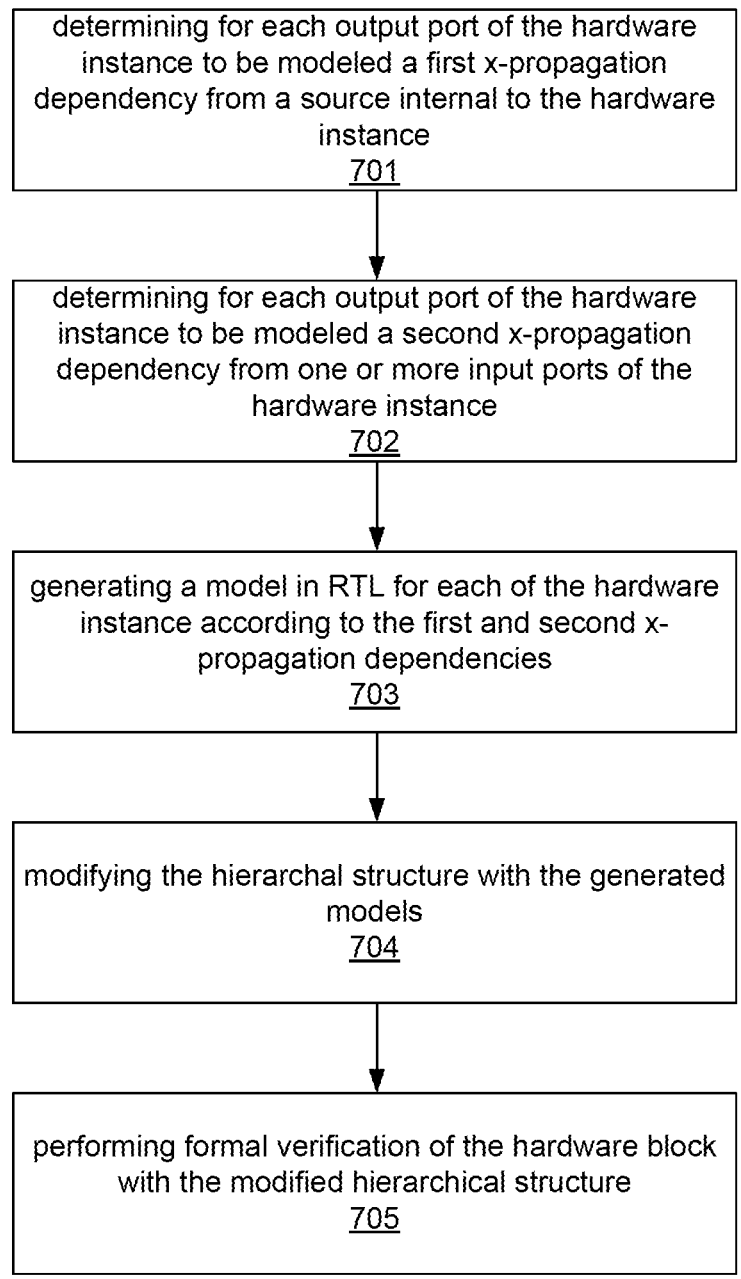
FIG. 7 illustrates a flowchart of a method for decomposing the IP block to form a new hierarchical structure for accelerating X-propagation mode formal verification of the IP block, according to some embodiments of the disclosure.

In some embodiments, the X-transparency check that finds paths from inputs to outputs might not find a single path from an input to an output. In such embodiments, there are no flip-flops in the functional or behavioral module and the functional or behavioral module will have the output with no drives (i.e., just the output). The TCL constraint file for the above case will have either of these two lines:

assume { !$isunknown(output); } // i.e., if the module is not the source of X
assume { $isunknown(output); } // i.e., if the module is the source of X FIG. 7 illustrates a flowchart 700 of a method for decomposing the IP block to form a new hierarchical structure for accelerating X-propagation mode formal verification of the IP block, according to some embodiments of the disclosure. It is pointed out that those elements of FIG. 7 having the same reference numbers (or names) as the elements of any other figure can operate or function in any manner similar to that described, but are not limited to such.

Although the blocks in the flowchart with reference to FIG. 7 are shown in a particular order, the order of the actions can be modified. Thus, the illustrated embodiments can be performed in a different order, and some actions/blocks may be performed in parallel. Some of the blocks and/or operations listed in FIG. 7 are optional in accordance with certain embodiments. The numbering of the blocks presented is for the sake of clarity and is not intended to prescribe an order of operations in which the various blocks must occur. Additionally, operations from the various flows may be utilized in a variety of combinations.

In flowchart 700, the subunit is replaced and formal verification is performed on the unit, according to some embodiments. In some embodiments, the leaves of the complexity tree do not have black-boxed subunits while other nodes may have one or more black-boxed subunits. By performing formal verification after replacing the subunits with its behavioral or functional model, computation complexity is reduced which leads to faster formal verification.

At block 701, for each output port of the hardware instance (i.e., the instance of the unit) to be functionally modeled, a first 'X' propagation dependency from a source internal to the hardware instance is determined. At block 702, for each output port of the hardware instance to be functionally modeled, a second 'X' propagation dependency from one or more input ports of the hardware instance is determined. At block 703, a functional model is generated in RTL (and a constraint file in TCL) for each of the hardware instances according to the first and second 'X' propagation dependencies. In some embodiments, the source of 'X' behavior comes from the TCL constraint file. At block 704, the hierarchical structure (or tree) is modified with the generated functional models. At block 705, formal verification (i.e., 'X' prop mode computation in this example) of the hardware block (i.e., UNIT 100 or 600) is performed using the modified hierarchical structure.

Program software code/instructions associated with flowchart 700 executed to implement embodiments of the disclosed subject matter may be implemented as part of an operating system or a specific application, component, program, object, module, routine, or other sequence of instructions or organization of sequences of instructions referred to as "program software code/instructions," "operating system program software code/instructions," "application program software code/instructions," or simply "software."

Figure 8A:
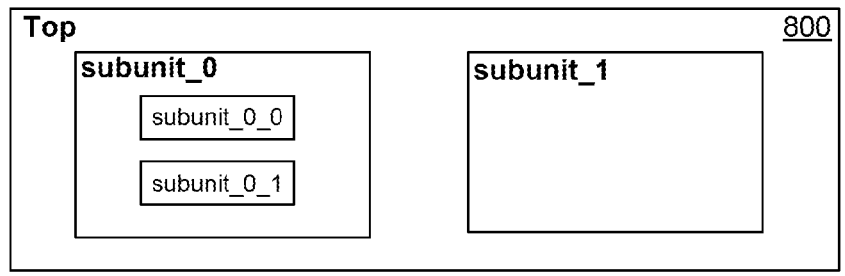
FIGS. 8A-C illustrate modification of hardware RTL model for accelerated formal verification, according to some embodiments of the disclosure.
Figure 8B:
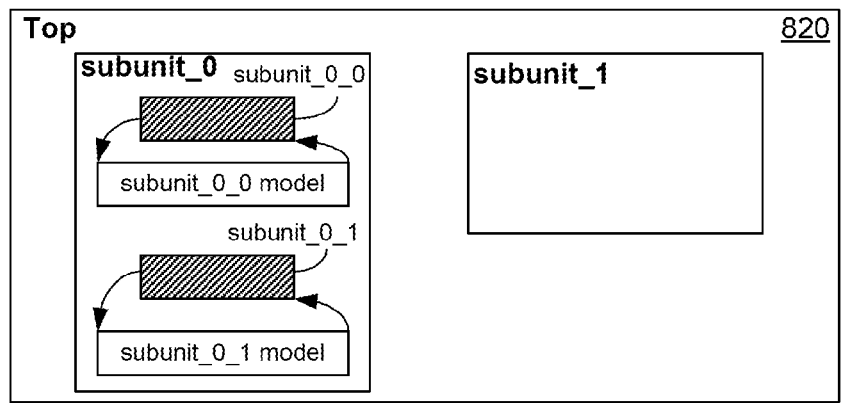
Figure 8C:
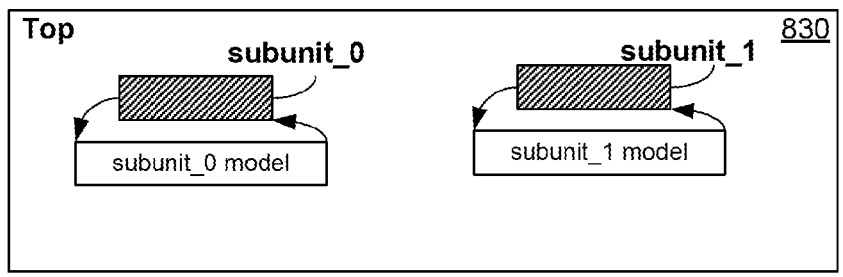

FIGS. 8A-C illustrate modification of a hardware RTL model for accelerated formal verification, according to some embodiments of the disclosure. It is pointed out that those elements of FIGS. 8A-C having the same reference numbers (or names) as the elements of any other figure can operate or function in any manner similar to that described, but is not limited to such.

FIG. 8A shows an IP top level 800 having two subunits—subunit_0 and subunit_1—where subunit_0 has two subunits, subunit_0_0 and subunit_0_1. The RTL code for IP top level 800 can be expressed as:

```
// Top IP block level 800
    module Top(input logic clk, input logic rst_n, . . .);
        unit _0 subunit_0(. . .);
        unit _1 subunit_1(. . .);
        //where unit_0 is the module name and subunit0 is the instance name
        // and unit_1 is the module name and subunit1 is the instance name
    endmodule
// Subunits of Top IP block level 800
    module unit_0(. . .);
        // instantiation of subunits in unit0
        unit_0_0 subunit_0_0(. . .);
        unit_0_1 subunit_0_1(. . .);
    endmodule
    module unit_1(. . .);
        . . .
    endmodule
    module unit0_0(. . .);
        . . .
    endmodule
    module unit0_1(. . .);
        . . .
    endmodule
```

The instance tree of the top level 800 can be expressed as:

```
Instance tree:
Top (module=Top)
    subunit_0 (module=unit0)
        subunit_0_0 (module=unit0_0)
        subunit_0_1 (module=unit0_1)
    subunit_1 (module=unit1)
```

In this example, assume all instances have a complexity greater than the minimum complexity metric (i.e., all instances are to be black boxed and replaced with functional models). In some embodiments, leaves of the tree (i.e., subunit_0_0, subunit_0_1, and subunit_1) are analyzed in parallel. The process or method executed for each of these instances of leaves is the same because they are analyzed in parallel.

FIG. 8B shows an IP top level 820. The models, subunit_0_0_model and subunit_0_1_model, are the functional models according to the mode of operation (e.g., Xprop, dead code analysis, etc.). The input and output ports of subunit_0_0_model and subunit_0_1_model are organized such that the ports connect the same way as the ports for subunit_0_0 and subunit_0_1. By replacing the complex subunit_0_0 and subunit_0_1 with their functional equivalents for the mode of verification makes the process of formal verification faster than traditional tools.

FIG. 8C shows an IP top level 830 in which the higher level subunits (i.e., subunit_0 and subunit_1) are analyzed (i.e., a bottom up approach). At this hierarchy level, subunit_0 and subunit_1 are replaced with their respective functional models, and the top level 830 is analyzed for 'X' propagation. This allows the calculations or analysis to be performed in an organized matter.

For example, first subunit_0_0, subunit_0_1, and subunit_1 can be calculated. After that, there are three functional models for the units. subunit_0 is then analyzed and its subunits (0_0 and 0_1) are replaced with their functional models, because their complexity is greater than the minimum. The same checks are run on subunit_0 for two reasons: One, subunit_0 itself can contain logic cells (i.e., flops, registers, RAMs, etc.), and second, subunit_0 can contain module instances with complexity less than minimum. In some embodiments, those module instances are kept within the subunit_0 and will be analyzed with the subunit_0.

After that, the functional model for subunit_0 is generated, according to some embodiments. The check for the top IP level is then executed and within the top IP level, the subunits (i.e., subunit_0 and subunit_1) are replaced because those contain the subunits 0_0 and 0_1 which are replaced automatically. X-Prop check is then executed on a top design that looks like the one illustrated in FIG. 8C.

Figure 9:
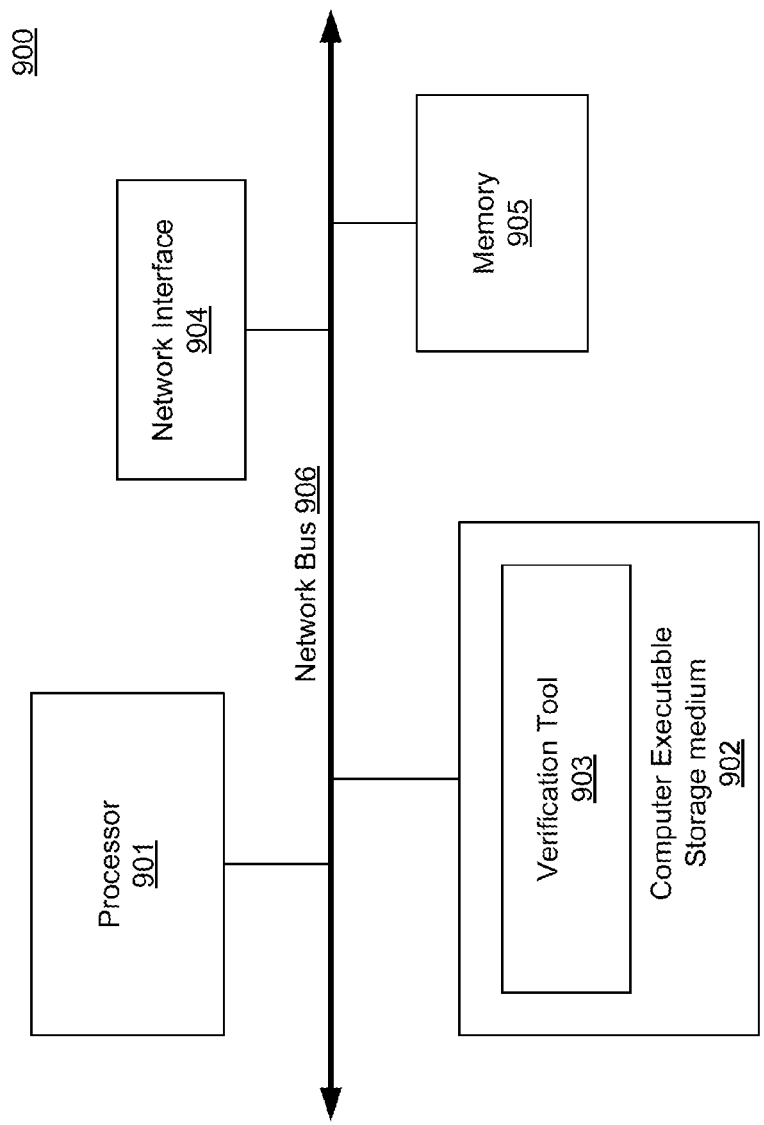
FIG. 9 illustrates a computing device with a computer executable storage medium to perform the processes of formal verification, according to some embodiments of the disclosure.

FIG. 9 illustrates a computing device 900 with a computer executable storage medium to perform the processes of formal verification, according to some embodiments of the disclosure. It is pointed out that those elements of FIG. 9 having the same reference numbers (or names) as the elements of any other figure can operate or function in any manner similar to that described, but are not limited to such.

In some embodiments, computing device 900 comprises Processor 901, Computer Executable Storage Medium 902 having instructions for performing the methods described here (i.e., Verification Tool 903), Network Interface 904, Memory 905, and Network Bus 906 coupled as shown.

Here, Computer Executable Storage medium 902 is a tangible machine readable medium that can be used to store program software code/instructions and data that, when executed by a computing device, cause Processor 901 to perform a method(s) as may be recited in one or more accompanying claims directed to the disclosed subject matter. The tangible machine readable medium may include storage of the executable software program code/instructions and data in various tangible locations, including for example ROM, volatile RAM, non-volatile memory and/or cache and/or other tangible memory as referenced in the present application. Portions of this program software code/instructions and/or data may be stored in any one of these storage and memory devices. Further, the program software code/instructions can be obtained from other storage, including, e.g., through centralized servers or peer to peer networks and the like, including the Internet. Different portions of the software program code/instructions and data can be obtained at different times and in different communication sessions or in a same communication session.

The software program code/instructions 903 (Verification Tool) and data can be obtained in their entirety prior to the execution of a respective software program or application by the computing device. Alternatively, portions of the software program code/instructions 903 and data can be obtained dynamically, e.g., just in time, when needed for execution. Alternatively, some combination of these ways of obtaining the software program code/instructions 903 and data may occur, e.g., for different applications, components, programs, objects, modules, routines or other sequences of instructions or organization of sequences of instructions, by way of example. Thus, it is not required that the data and instructions be on a tangible machine readable medium in entirety at a particular instance of time.

Examples of tangible computer-readable media 902 include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The software program code/instructions may be temporarily stored in digital tangible communication links while implementing electrical, optical, acoustical or other forms of propagating signals, such as carrier waves, infrared signals, digital signals, etc. through such tangible communication links.

In general, a tangible machine readable medium 902 includes any tangible mechanism that provides (i.e., stores and/or transmits in digital form, e.g., data packets) information in a form accessible by a machine (i.e., a computing device), which may be included, e.g., in a communication device, a computing device, a network device, a personal digital assistant, a manufacturing tool, a mobile communication device, whether or not able to download and run applications and subsidized applications from the communication network, such as the Internet, e.g., an iPhone®, Blackberry® Droid®, or the like, or any other device including a computing device. In one embodiment, processor-based system is in a form of or included within a PDA, a cellular phone, a notebook computer, a tablet, a game console, a set top box, an embedded system, a TV, a personal desktop computer, etc. Alternatively, the traditional communication applications and subsidized application(s) may be used in some embodiments of the disclosed subject matter.

Figure 10:
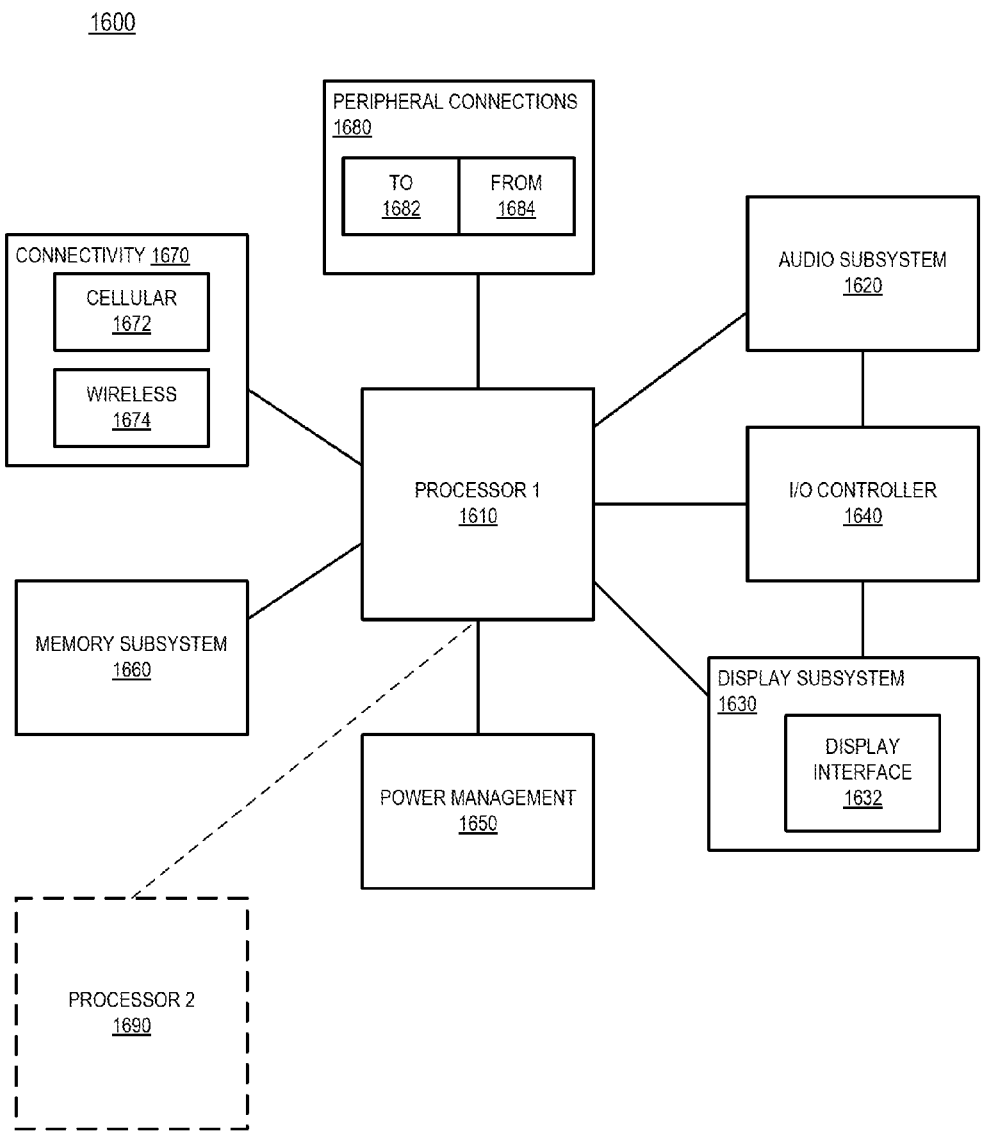
FIG. 10 illustrates an IP block, which is a smart device or a computer system or a SoC (System-on-Chip), for formal verification according to some embodiments of the disclosure.

FIG. 10 illustrates an IP block 1600 (e.g., UNIT 100), which is a smart device or a computer system or a SoC (System-on-Chip), for formal verification according to some embodiments of the disclosure. It is pointed out that those elements of FIG. 10 having the same reference numbers (or names) as the elements of any other figure can operate or function in any manner similar to that described, but are not limited to such. Formal verification of this IP block can be performed using the embodiments described above.

FIG. 10 illustrates a block diagram of an embodiment of a mobile device in which flat surface interface connectors could be used. In one embodiment, computing device 1600 represents a mobile computing device, such as a computing tablet, a mobile phone or smart-phone, a wireless-enabled e-reader, or other wireless mobile device. It will be understood that certain components are shown generally, and not all components of such a device are shown in computing device 1600.

In some embodiments, computing device 1600 includes processor 1610 (and/or processor 1690) which can include one or more physical devices, such as microprocessors, application processors, microcontrollers, programmable logic devices, or other processing means. The processing operations performed by processor 1610 include the execution of an operating platform or operating system on which applications and/or device functions are executed. The processing operations include operations related to I/O (input/output) with a human user or with other devices, operations related to power management, and/or operations related to connecting the computing device 1600 to another device. The processing operations may also include operations related to audio I/O and/or display I/O. The various embodiments of the present disclosure may also comprise a network interface within 1670 such as a wireless interface so that a system embodiment may be incorporated into a wireless device, for example, cell phone or personal digital assistant.

In some embodiments, computing device 1600 includes audio subsystem 1620, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into computing device 1600, or connected to the computing device 1600. In one embodiment, a user interacts with the computing device 1600 by providing audio commands that are received and processed by processor 1610.

Display subsystem 1630 represents hardware (e.g., display devices) and software (e.g., drivers) components that provide a visual and/or tactile display for a user to interact with the computing device 1600. Display subsystem 1630 includes display interface 1632, which includes the particular screen or hardware device used to provide a display to a user. In one embodiment, display interface 1632 includes logic separate from processor 1610 to perform at least some processing related to the display. In one embodiment, display subsystem 1630 includes a touch screen (or touch pad) device that provides both output and input to a user.

I/O controller 1640 represents hardware devices and software components related to interaction with a user. I/O controller 1640 is operable to manage hardware that is part of audio subsystem 1620 and/or display subsystem 1630. Additionally, I/O controller 1640 illustrates a connection point for additional devices that connect to computing device 1600 through which a user might interact with the system. For example, devices that can be attached to the computing device 1600 might include microphone devices, speaker or stereo systems, video systems or other display devices, keyboard or keypad devices, or other I/O devices for use with specific applications such as card readers or other devices.

As mentioned above, I/O controller 1640 can interact with audio subsystem 1620 and/or display subsystem 1630. For example, input through a microphone or other audio device can provide input or commands for one or more applications or functions of the computing device 1600. Additionally, audio output can be provided instead of, or in addition to display output. In another example, if display subsystem 1630 includes a touch screen, the display device also acts as an input device, which can be at least partially managed by I/O controller 1640. There can also be additional buttons or switches on the computing device 1600 to provide I/O functions managed by I/O controller 1640.

In some embodiments, I/O controller 1640 manages devices such as accelerometers, cameras, light sensors or other environmental sensors, or other hardware that can be included in the computing device 1600. The input can be part of direct user interaction, as well as providing environmental input to the system to influence its operations (such as filtering for noise, adjusting displays for brightness detection, applying a flash for a camera, or other features).

In some embodiments, computing device 1600 includes power management 1650 that manages battery power usage, charging of the battery, and features related to power saving operation. Memory subsystem 1660 includes memory devices for storing information in computing device 1600. Memory can include nonvolatile (state does not change if power to the memory device is interrupted) and/or volatile (state is indeterminate if power to the memory device is interrupted) memory devices. Memory subsystem 1660 can store application data, user data, music, photos, documents, or other data, as well as system data (whether long-term or temporary) related to the execution of the applications and functions of the computing device 1600.

Connectivity 1670 includes hardware devices (e.g., wireless and/or wired connectors and communication hardware) and software components (e.g., drivers, protocol stacks) to enable the computing device 1600 to communicate with external devices. The computing device 1600 could be separate devices, such as other computing devices, wireless access points or base stations, as well as peripherals such as headsets, printers, or other devices.

Connectivity 1670 can include multiple different types of connectivity. To generalize, the computing device 1600 is illustrated with cellular connectivity 1672 and wireless connectivity 1674. Cellular connectivity 1672 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity (or wireless interface) 1674 refers to wireless connectivity that is not cellular, and can include personal area networks (such as Bluetooth, Near Field, etc.), local area networks (such as Wi-Fi), and/or wide area networks (such as WiMax), or other wireless communication.

Peripheral connections 1680 include hardware interfaces and connectors, as well as software components (e.g., drivers, protocol stacks) to make peripheral connections. It will be understood that the computing device 1600 could both be a peripheral device ("to" 1682) to other computing devices, as well as have peripheral devices ("from" 1684) connected to it. The computing device 1600 commonly has a "docking" connector to connect to other computing devices for purposes such as managing (e.g., downloading and/or uploading, changing, synchronizing) content on computing device 1600. Additionally, a docking connector can allow computing device 1600 to connect to certain peripherals that allow the computing device 1600 to control content output, for example, to audiovisual or other systems.

In addition to a proprietary docking connector or other proprietary connection hardware, the computing device 1600 can make peripheral connections 1680 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. For example, other memory architectures e.g., Dynamic RAM (DRAM) may use the embodiments discussed. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

For example, a method performed by a computing device is provided which comprises: deriving a hierarchal structure of hardware instances of a hardware block, wherein the hardware block is described in a RTL; determining complexity of at least one hardware instance, in the hierarchal structure, with reference to a complexity metric; identifying, in response to the determined complexity of the at least one hardware instance, whether the hardware instance is to be modeled; and modifying the hierarchal structure with information about the to be modeled hardware instance.

In some embodiments, the method comprises generating a model for the at least one hardware instance which is identified to be modeled. In some embodiments, the method comprises modifying the hierarchal structure with the generated model. In some embodiment, the method comprises performing formal verification of the hardware block with the modified hierarchical structure. In some embodiments, wherein clock and reset signals and their respective functions for the at least one hardware instance are maintained in the generated model. In some embodiments, the model has a type that depends on a computation type.

In some embodiments, the computation type is one of: X-propagation analysis; FSM analysis; or Dead Code analysis. In some embodiments, the X-propagation analysis comprises: determining for at least one output port of the at least one hardware instance to be modeled a first x-propagation dependency from a source internal to the hardware instance. In some embodiments, the X-propagation analysis comprises: determining for at least one output port of the at least one hardware instance to be modeled a second x-propagation dependency from zero or more input ports of the at least one hardware instance.

In some embodiments, the method comprises: generating a model in RTL for at least one of the at least one hardware instance according to the first and second x-propagation dependencies. In some embodiments, the method comprises modifying the hierarchal structure with the generated model. In some embodiments, the method comprises performing formal verification of the hardware block with the modified hierarchical structure. In some embodiments, wherein deriving the at least one hierarchical structure comprises forming a tree of one or more hardware instances in the hardware block.

In some embodiments, the complexity metric is one or more of: a sum of flip-flop bits in the at least one hardware instance; a sum of latch bits in the at least one hardware instance; or a sum of port bits of the at least one hardware instance. In some embodiments, the complexity metric is a weighted average of two or more of: a sum of flip-flop bits in the at least one hardware instance; a sum of latch bits in the at least one hardware instance; and a sum of port bits of the at least one hardware instance.

In some embodiments, determining the complexity of the at least one hardware instance comprises: determining whether the complexity of the at least one hardware instance is equal or greater than a minimum of the complexity metric, and if so, identifying the at least one hardware instance to be modeled otherwise the at least one hardware instance is not modeled. In some embodiments, wherein determining the complexity of the at least one hardware instance comprises: determining whether the complexity of the at least one hardware instance is equal or greater than a maximum of the complexity metric, and if so, the at least one hardware instance is divided into sub-units for further complexity analysis.

In another example, a computer executable storage medium having instructions stored thereon is provided that, when executed, causes a machine to perform a method, the method according to the method described above.

In another example, a system is provided which comprises: a first module to derive a hierarchal structure of hardware instances of a hardware block, wherein the hardware block is described in a RTL; a second module to determine complexity of at least one hardware instance, in the hierarchal structure, with reference to a complexity metric; a third module to identify, in response to the determined complexity of at the least one hardware instance, whether the at least one hardware instance is to be modeled; and a fourth module to modify the hierarchal structure with information about the to be modeled hardware instance.

In some embodiments, the system further comprises: a fifth module to generate a model for the at least one hardware instance which is identified to be modeled; and a sixth module to modify the hierarchal structure with the generated model. In some embodiments, the system comprises a module for generating a model for the at least one hardware instance which is identified to be modeled.

In some embodiments, the system a module for modifying the hierarchal structure with the generated model. In some embodiments, the system comprises a module for performing formal verification of the hardware block with the modified hierarchical structure. In some embodiments, clock and reset signals and their respective functions for the at least one hardware instance are maintained in the generated model.

In some embodiments, the model has a type that depends on a computation type. In some embodiments, the computation type is one of: X-propagation analysis; FSM analysis; or Dead Code analysis. In some embodiments, the X-propagation analysis comprises: a module for determining for at least one output port of the at least one hardware instance to be modeled a first x-propagation dependency from a source internal to the hardware instance. In some embodiments, the X-propagation analysis comprises: a module for determining for at least one output port of the at least one hardware instance to be modeled a second x-propagation dependency from zero or more input ports of the at least one hardware instance.

In some embodiments, the system comprises: a module for generating a model in RTL for at least one of the at least one hardware instance according to the first and second x-propagation dependencies. In some embodiments, the system comprises a module for modifying the hierarchal structure with the generated model. In some embodiments, the system comprises a module for performing formal verification of the hardware block with the modified hierarchical structure. In some embodiments, the module for deriving the at least one hierarchical structure comprises a module for forming a tree of one or more hardware instances in the hardware block.

In some embodiments, the complexity metric is one or more of: a sum of flip-flop bits in the at least one hardware instance; a sum of latch bits in the at least one hardware instance; or a sum of port bits of the at least one hardware instance. In some embodiments, the complexity metric is a weighted average of two or more of: a sum of flip-flop bits in the at least one hardware instance; a sum of latch bits in the at least one hardware instance; and a sum of port bits of the at least one hardware instance. In some embodiments, the module for determining the complexity of the at least one hardware instance comprises: a module for determining whether the complexity of the at least one hardware instance is equal or greater than a minimum of the complexity metric, and if so, identifying the at least one hardware instance to be modeled otherwise the at least one hardware instance is not modeled.

In some embodiments, the module for determining the complexity of the at least one hardware instance comprises: determining whether the complexity of the at least one hardware instance is equal or greater than a maximum of the complexity metric, and if so, the at least one hardware instance is divided into sub-units for further complexity analysis.

In another example, an apparatus is provided which comprises: means for deriving a hierarchal structure of hardware instances of a hardware block, wherein the hardware block is described in a RTL; means for determining complexity of at least one hardware instance, in the hierarchal structure, with reference to a complexity metric; means for identifying, in response to the determined complexity of the at least one hardware instance, whether the hardware instance is to be modeled; and means for modifying the hierarchal structure with information about the to be modeled hardware instance.

In some embodiments, the apparatus comprises means for generating a model for the at least one hardware instance which is identified to be modeled. In some embodiments, the apparatus comprises means for modifying the hierarchal structure with the generated model. In some embodiments, the apparatus comprises means for performing formal verification of the hardware block with the modified hierarchical structure. In some embodiments, clock and reset signals and their respective functions for the at least one hardware instance are maintained in the generated model.

In some embodiments, the model has a type that depends on a computation type. In some embodiments, the computation type is one of: X-propagation analysis; FSM analysis; or Dead Code analysis. In some embodiments, the X-propagation analysis comprises: means for determining for at least one output port of the at least one hardware instance to be modeled a first x-propagation dependency from a source internal to the hardware instance. In some embodiments, the X-propagation analysis comprises: means for determining for at least one output port of the at least one hardware instance to be modeled a second x-propagation dependency from zero or more input ports of the at least one hardware instance.

In some embodiments, the apparatus comprises: means for generating a model in RTL for at least one of the at least one hardware instance according to the first and second x-propagation dependencies. In some embodiments, the apparatus comprises means for modifying the hierarchal structure with the generated model. In some embodiments, the apparatus comprises means for performing formal verification of the hardware block with the modified hierarchical structure.

In some embodiments, deriving the at least one hierarchical structure comprises means for forming a tree of one or more hardware instances in the hardware block. In some embodiments, the complexity metric is one or more of: a sum of flip-flop bits in the at least one hardware instance; a sum of latch bits in the at least one hardware instance; or a sum of port bits of the at least one hardware instance. In some embodiments, the complexity metric is a weighted average of two or more of: a sum of flip-flop bits in the at least one hardware instance; a sum of latch bits in the at least one hardware instance; and a sum of port bits of the at least one hardware instance.

In some embodiments, the means for determining the complexity of the at least one hardware instance comprises: means for determining whether the complexity of the at least one hardware instance is equal or greater than a minimum of the complexity metric, and if so, identifying the at least one hardware instance to be modeled otherwise the at least one hardware instance is not modeled. In some embodiments, the means for determining the complexity of the at least one hardware instance comprises: means for determining whether the complexity of the at least one hardware instance is equal or greater than a maximum of the complexity metric, and if so, the at least one hardware instance is divided into sub-units for further complexity analysis.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. A method performed by a computing device, the method comprising:
   deriving, by the computing device having a processor and a memory, a hierarchical structure of hardware instances of a hardware block, wherein the hardware block is described in a register transfer language (RTL);
   determining, by the computing device, complexity of at least one hardware instance, in the hierarchical structure, with reference to a complexity metric, wherein the complexity metric is one or more of the following or is a weighted average of two or more of the following:
   a sum of flip-flop bits in the at least one hardware instance;
   a sum of latch bits in the at least one hardware instance; or
   a sum of port bits of the at least one hardware instance;
   identifying, by the computing device, in response to the determined complexity of the at least one hardware instance, whether the hardware instance is to be modeled; and
   modifying, by the computing device, the hierarchical structure of the hardware instances of the hardware block with information about the to-be modeled hardware instance.

2. The method of claim 1 comprises generating a model for the at least one hardware instance which is identified to be modeled.

3. The method of claim 2 comprises modifying the hierarchical structure with the generated model.

4. The method of claim 3 comprises performing formal verification of the hardware block with the modified hierarchical structure.

5. The method of claim 2, wherein clock and reset signals and their respective functions for the at least one hardware instance are maintained in the generated model.

6. The method of claim 2, wherein the model has a type that depends on a computation type.

7. The method of claim 6, wherein the computation type is one of:
   X-propagation analysis;
   Finite State Machine (FSM) analysis; or
   Dead Code analysis.

8. The method of claim 7, wherein the X-propagation analysis comprises:
   determining for at least one output port of the at least one hardware instance to be modeled a first x-propagation dependency from a source internal to the hardware instance.

9. The method of claim 8, wherein the X-propagation analysis comprises:
   determining for at least one output port of the at least one hardware instance to be modeled a second x-propagation dependency from zero or more input ports of the at least one hardware instance.

10. The method of claim 9 comprises:
    generating a model in RTL for at least one of the at least one hardware instance according to the first and second x-propagation dependencies.

11. The method of claim 10 comprises modifying the hierarchical structure with the generated model.

12. The method of claim 11 comprises performing formal verification of the hardware block with the modified hierarchical structure.

13. The method of claim 1, wherein deriving the at least one hierarchical structure comprises forming a tree of one or more hardware instances in the hardware block.

14. The method of claim 1, wherein determining the complexity of the at least one hardware instance comprises:
    determining whether the complexity of the at least one hardware instance is equal or greater than a minimum of the complexity metric, and if so, identifying the at least one hardware instance to be modeled otherwise the at least one hardware instance is not modeled.

15. The method of claim 14, wherein determining the complexity of the at least one hardware instance comprises:
    determining whether the complexity of the at least one hardware instance is equal or greater than a maximum of the complexity metric, and if so, the at least one hardware instance is divided into sub-units for further complexity analysis.

16. A computer executable non-transitory storage medium having instructions stored thereon that, when executed, cause a machine to perform a method, the method comprising:
    deriving a hierarchical structure of hardware instances of a hardware block, wherein the hardware block is described in a register transfer language (RTL);

determining complexity of at least one hardware instance, in the hierarchical structure, with reference to a complexity metric, wherein the complexity metric is one or more of the following or is a weighted average of two or more of the following:
- a sum of flip-flop bits in the at least one hardware instance;
- a sum of latch bits in the at least one hardware instance; or
- a sum of port bits of the at least one hardware instance;

identifying, in response to the determined complexity of the at least one hardware instance, whether the at least one hardware instance is to be modeled; and modifying the hierarchical structure with information about the to-be modeled hardware instance.

17. The computer executable non-transitory storage medium of claim 16, wherein the method comprises:
  generating a model for the at least one hardware instance which is identified to be modeled; and
  modifying the hierarchical structure with the generated model.

18. A system comprising:
  a processor;
  one or more memories coupled to the processor, the one or more memories having executable instructions including:
    a first module to derive a hierarchical structure of hardware instances of a hardware block, wherein the hardware block is described in a register transfer language (RTL);
    a second module to determine complexity of at least one hardware instance, in the hierarchical structure, with reference to a complexity metric, wherein the complexity metric is one or more of the following or is a weighted average of two or more of the following:
      a sum of flip-flop bits in the at least one hardware instance;
      a sum of latch bits in the at least one hardware instance; or
      a sum of port bits of the at least one hardware instance;
    a third module to identify, in response to the determined complexity of the at least one hardware instance, whether the at least one hardware instance is to be modeled; and
    a fourth module to modify the hierarchical structure with information about the to-be modeled hardware instance; and
  a wireless interface for allowing the processor to communicate with another device.

19. The system of claim 18, wherein the one or more memories include further executable instructions including:
  a fifth module to generate a model for the at least one hardware instance which is identified to be modeled; and
  a sixth module to modify the hierarchical structure with the generated model.

* * * * *